PORTABLE DRILLING EQUIPMENT

Filed Sept. 26, 1949

INVENTOR.
JAMES MOON
BY Philip Subkow
ATTORNEY.

Sept. 14, 1954 J. MOON 2,688,848

PORTABLE DRILLING EQUIPMENT

Filed Sept. 26, 1949 7 Sheets-Sheet 2

INVENTOR.
JAMES MOON
BY Philip Subkow
ATTORNEY.

PORTABLE DRILLING EQUIPMENT

Filed Sept. 26, 1949

Inventor
JAMES MOON
By Philip Subkow
Attorney

Sept. 14, 1954 J. MOON 2,688,848

PORTABLE DRILLING EQUIPMENT

Filed Sept. 26, 1949 7 Sheets-Sheet 4

Inventor

JAMES MOON

By

Attorney

Sept. 14, 1954 J. MOON 2,688,848

PORTABLE DRILLING EQUIPMENT

Filed Sept. 26, 1949 7 Sheets-Sheet 5

Inventor

JAMES MOON

By Philip Subkow

Attorney

INVENTOR.
JAMES MOON
BY Philip Sublonow
ATTORNEY.

Sept. 14, 1954 J. MOON 2,688,848

PORTABLE DRILLING EQUIPMENT

Filed Sept. 26, 1949 7 Sheets-Sheet 7

INVENTOR.
JAMES MOON
BY Philip Subkow
ATTORNEY.

Patented Sept. 14, 1954 2,688,848

UNITED STATES PATENT OFFICE 2,688,848

PORTABLE DRILLING EQUIPMENT

James Moon, Corona Del Mar, Calif., assignor to Signal Oil and Gas Company, Los Angeles, Calif., a corporation of Delaware Application September 26, 1949, Serial No. 117,767

18 Claims. (Cl. 61—46)

This invention relates to structures suitable for positioning in submarine bottoms for use in connection with an island or pier, and particularly for use in connection with the drilling of oil or gas wells in marine bottoms. This application is a continuation-in-part of my Patent No. 2,539,695, issued January 30, 1951, and my Patent No. 2,482,788, issued September 27, 1949.

The structure of this application is capable of use in deep water, rivers, lakes, bays, seas or other bottoms herein generally referred to as marine bottoms, and which is transportable in sections to the site where the structure is to be erected and assemblable at the site and, if thereafter desired, disassemblable and transportable in sections.

This invention relates to an assemblable platform or island capable of being erected both in shallow and in deep water and to a depth of 100′ or more, and which may be either disassembled into its original sections or permanently fixed on the bottom underlying the water in which it is erected. The structure is composed of prefabricated cell sections which may be transported individually to the site or transported in groups and erected at such site. Each section is composed of the well site section designed to receive and support surface casing and the turntable, a derrick receiving and supporting section suitably designed to receive and support a collapsible mast or derrick, such as is used in connection with portable drilling equipment, or, if desired, ordinary fixed derricks such as are employed on land, a section for supporting the drilling engine and hoist and other equipment employed for such purpose or which is otherwise designed to receive servicing equipment which may be used after the well has been drilled and is producing.

A flotation tank is provided to assist the erection of the unit and assembly of multiple units, the tank being provided with means to receive cement or other weighting material, in order to stabilize the structure. Means are also provided upon such structure for erecting and moving such drilling equipment or portable servicing equipment from well site to well site.

When assembled the cell sections present a closely packed plurality of cells which make up a drilling pier upon which a large number of wells may be drilled, spaced apart by the width of such well sections. Since the cell sections are made relatively narrow, merely sufficient to accommodate the drilling equipment and the derrick, the well spacing is far too close for desirable oil field development. I therefore propose that the wells be drilled by directional drilling from the several locations so that they may be bottomed at the desired horizon at the spacing which is most efficient for oil field development. The cell sections mutually brace each other and give a very stable and strong foundation for the drilling platform and reduce the area of platform required for the number of well sites necessary for the development of a large oil field.

Although this structure may be employed with permanently installed drilling equipment or servicing equipment and derricks, I prefer to use portable drilling equipment and derricks which may be moved from location to location and which may be positioned at the well sites. This makes it possible to space the wells more closely than would be permitted by using permanent drilling equipment and derricks and reduces the number of such drilling or servicing units which is necessary because the units may be used from location to location, and may be removed from the drilling platform whenever desired. This is particularly important in case of storms or heavy weather at sea when the equipment above the drilling platform may be subjected to hazards due to wind and rain.

These and other objects of my invention will be more clearly understood from the following description of my invention taken together with the drawings, in which Fig. 1 is a side view of my drilling platform;

Figure 1:
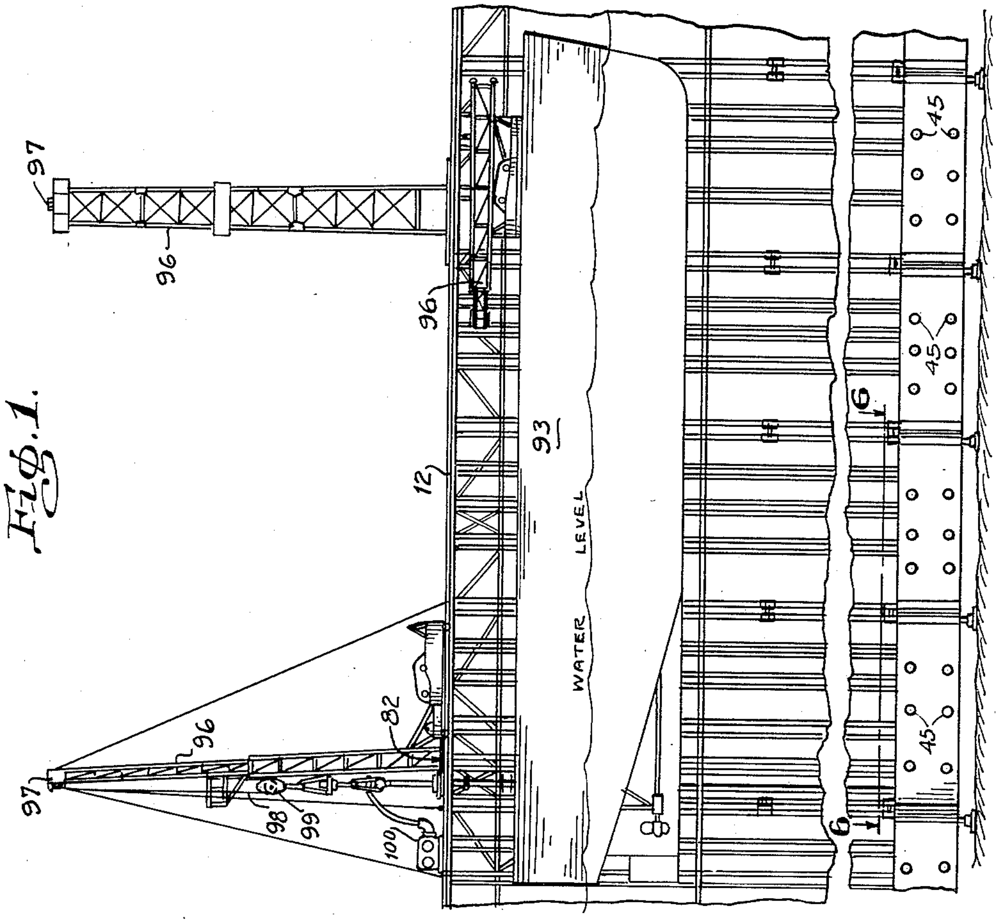
Figure 2:
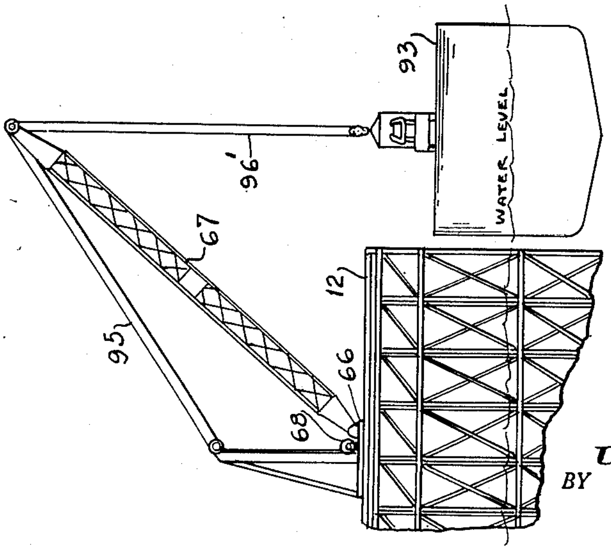
Fig. 2 is an end view thereof.
Figure 3:
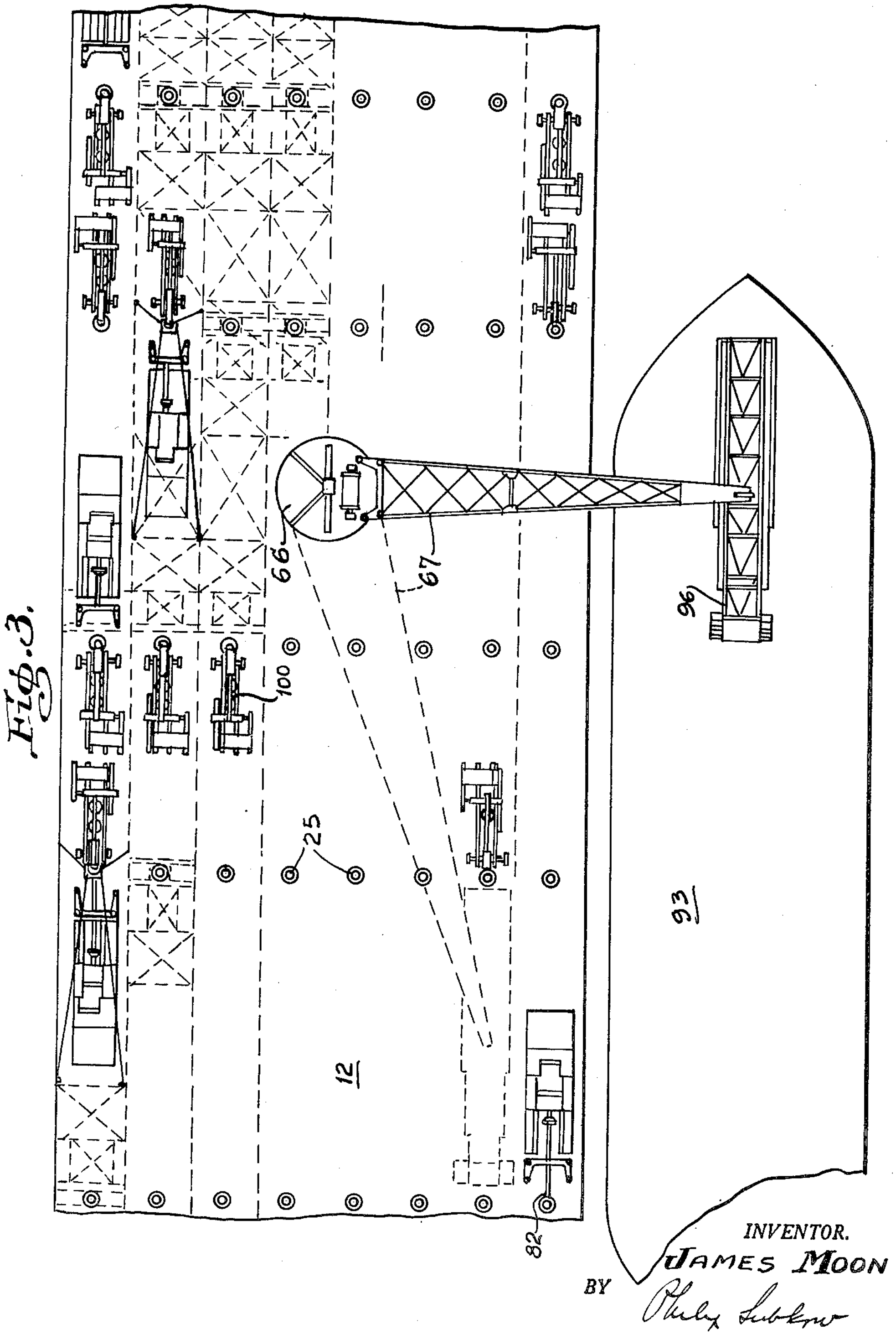
Fig. 3 is a plan view of the assembled drilling platform.

The drilling platform is made by assembling a plurality of cells constructed as shown in Figs. 7–15, inclusive. Each of said cells is composed of a plurality of bays. One of said bays 3 is the well site; 4 is the derrick supporting bay; and 5 is the drilling equipment supporting bay. Each of said bays is formed of four vertical columns, as shown. The bay 3 is composed of four vertical columns 6, 7, 10, and 11, as shown. The columns 10 and 11 may be of any design. They may be structural members or pipes or of any other construction. Columns 6 and 7, however, are tubular and have the construction hereinafter described.

These vertical columns 10 and 11 are provided in bays 4 and 5. At the extreme end of bay 5 are two vertical tubular members 8 and 9, the construction of which will be more fully described below. At the platform level 1, the vertical members 10, 7, 8, and 9 are connected by lateral girders 12 running longitudinally of the length of the cells and outside lateral members 13 running the width of the cell forming the outline of the cell. Suitable cross bracing 14 may be provided in cell 5.

In bay 4 I provide two longitudinal bracings 18. Additional bracings running the width of the cell may be provided at 15 parallel to the bracings 13. Bracings 16 and 17 are also positioned between the members 12 and parallel to the members 13 and 15, spaced the width of the cell 4. Bay 4 is thus defined by the members 12, 16, and 17, and bay 3 is defined by members 12, 13, and 17. Two lateral members connecting the cross bracings 16 and 17 are spaced apart and cross-connected by the cross members 19. The spacing between the members 18 is designed to receive the legs of the derrick to be positioned upon it. This will be more fully described below.

In bay 3 I provide two cross members 20 connecting the members 12 connected by members 21 perpendicular to the members 20. Members 20 and 21 are spaced apart sufficiently to permit the passage of the well casing and also positioned to support the rotary table. Cross members 22 may also be provided for additional bracing. The spacing of the bays 3 and 4 is such that when the derrick is erected to be supported on bay 4, it will be in proper position with respect to members 21 and the rotary table positioned in the bay 3.

At the bottom of the cell I provide a tank 23 which is of the width and length of the cell. Internal bracing may be provided, as shown at 24, and lateral bracings 25′ may also be provided in the tank which, acting with the skin of the tank, forms a girder to which the vertical uprights 6, 7, 8, 9, and 10 may be connected. A conduit 25 passing through the top and bottom of the tank provides a passage for the well casing and also to seal the tank. The tank is thus converted into a girder to support the vertical uprights as will be more fully described below.

The uprights 6, 7, 8, and 9 are pipes which extend through the top of the tank, the tank's shell being welded to the pipes, as shown, to form a tight seal. Pipe 8 beneath the bottom of the tank has a jet foot 26 with a nozzle 27 carrying side jet orifices 27′. A plug 28 may be screwed into the top of the upright 8 above the level of the platform 1. The plug 28 may be unscrewed and withdrawn and the fitting 29 introduced in its place to which there may be connected a pipe 30 carrying a valve 31 through which any jetting fluid, such as air or water, may be introduced to pass down through 8 and be discharged through orifices 27′, as will be indicated below.

The pipe 9 has a plug similar to 28 positioned above the top of the platform 1 and passes through tank 23 and is suitably sealed therein to make an airtight connection. In the tank, beneath the top thereof, above plug 41′ are orifices 40′ positioned in pipe 6 which connect the interior of the tank with the exterior of the pipe above the plug 41′.

Figure 10:
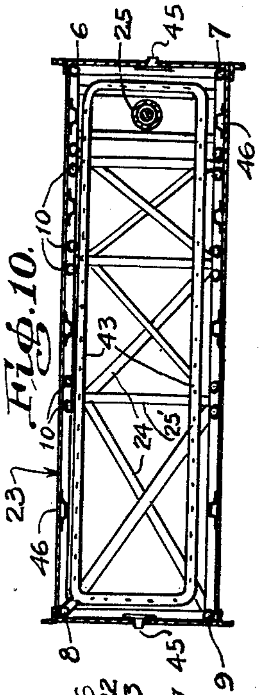
Fig. 10 is a section taken along line 10—10 of Fig. 7.

The upright 7 is also a tubular conduit which may be closed by a plug similar to 28 above the level of the platform and passes through the top of the tank and is connected by a pipe 42 to a pipe loop 43 which contains perforations or orifices, which loop extends through the length or width of the tank and is positioned on the bottom thereof as illustrated in Fig. 10.

A cylindrical barrel 32 (see Fig. 21) is positioned at the bottom of the conduit 9 within the tank 23. A cylindrical head 33 carrying an orifice 35 is positioned at the top of the barrel 32. Suitably positioned within the barrel 32 is a piston 33 provided with wall packing 34 carried by nut 35 and a piston rod 36 which passes through a gland 37 and a stuffing box 38.

This rod 36 passes through the packing gland 37 and is connected to a levelling foot 40 by a ball-and-socket joint 41 adjustably mounted in the socket by a nut and stud 42 mounted to give sufficient play to give adjustment of the ball-and-socket joint in an orifice 43 in the foot 40.

Figure 21:
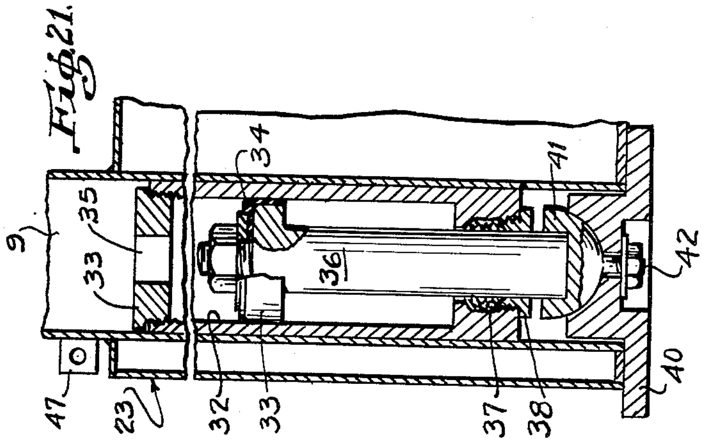
Fig. 21 is a vertical section of the tank at the levelling foot.
Figure 9:
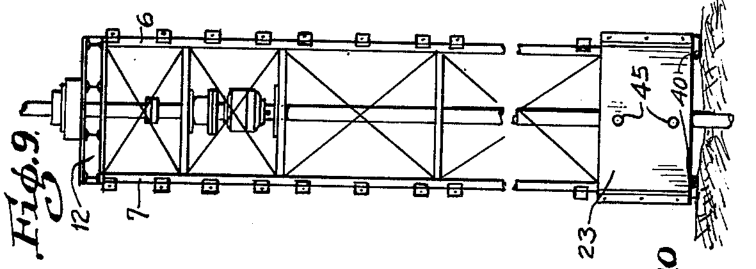
Fig. 9 is a side view of Fig. 7.
Figure 8:
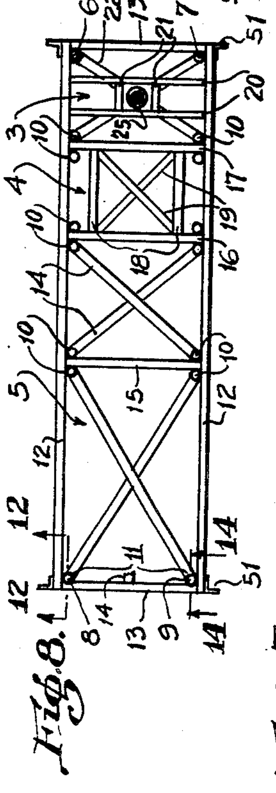
Fig. 8 is a section taken along line 8—8 of Fig. 7.
Figure 7:
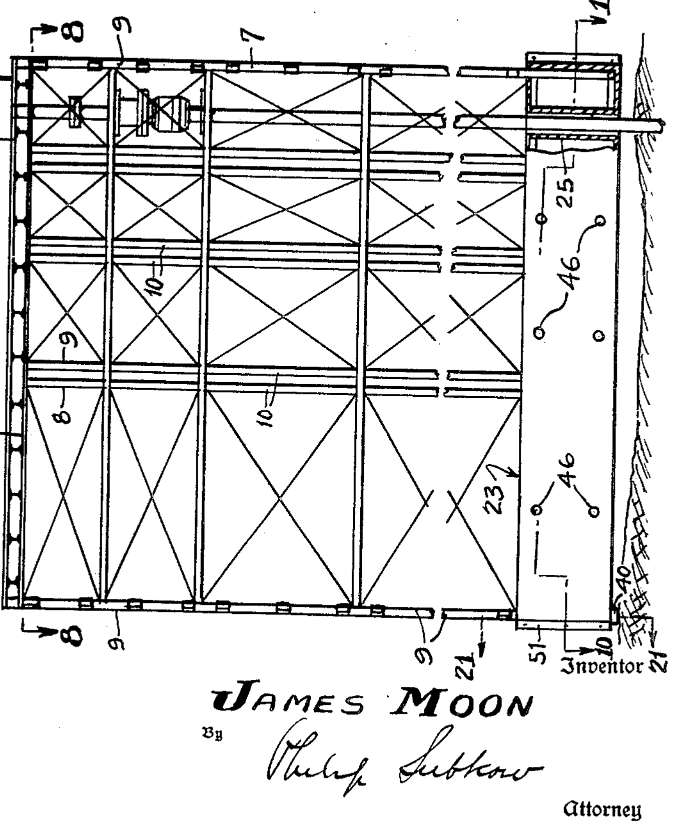
Fig. 7 is a side view of one of the cells employed in constructing the platform of Fig. 1.

In the form shown in Fig. 21 the movement of the piston rod 36, and therefore the extension of the levelling foot 40, is limited. Where it is desired to extend the foot a distance greater than is provided for in the form shown in Fig. 21, the barrel 32 and the piston rod 36 may be made of any length. The piston rod 36 is made of sufficient sections to supply the necessary rigidity for the necessary column loading.

Figures 16, 20:
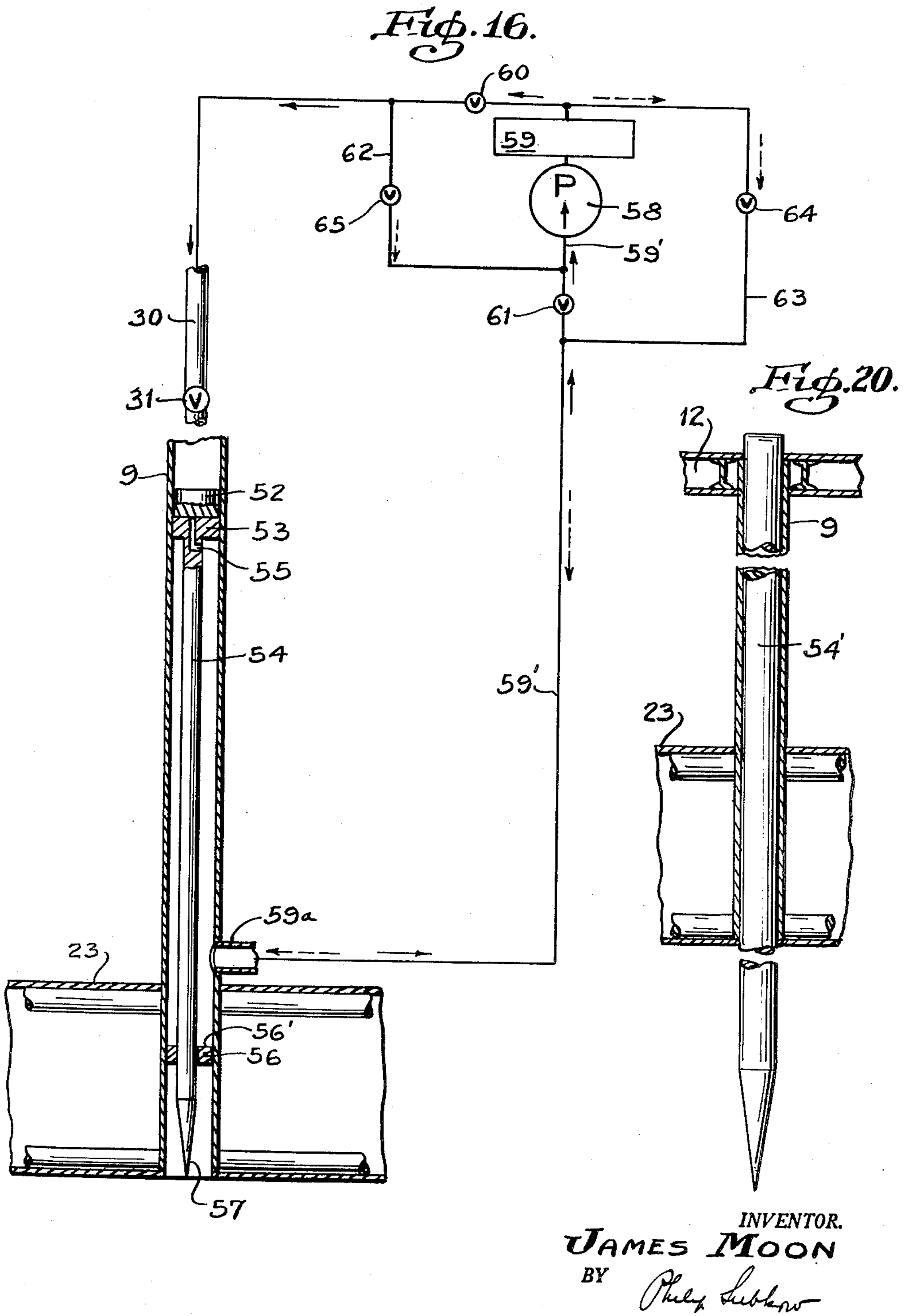
Fig. 16 is a modification of Fig. 15.
Fig. 20 is a modification of the anchoring of the structure showing a section similar to 19—19.
Figure 19:
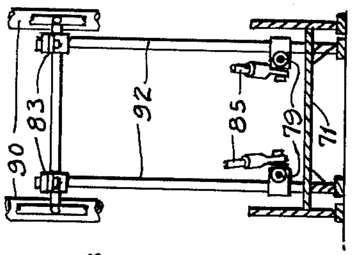
Fig. 19 is a fragmentary section, on 19—19 of Fig. 18, of the elevating mechanism shown in Figs. 17 and 18.
Figure 17:
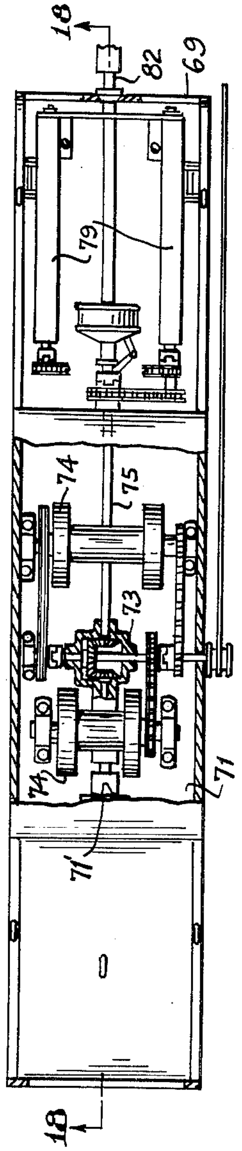
Fig. 17 is a plan view of one form of a portable drilling equipment useful in connection with my drilling platform.
Figure 18:
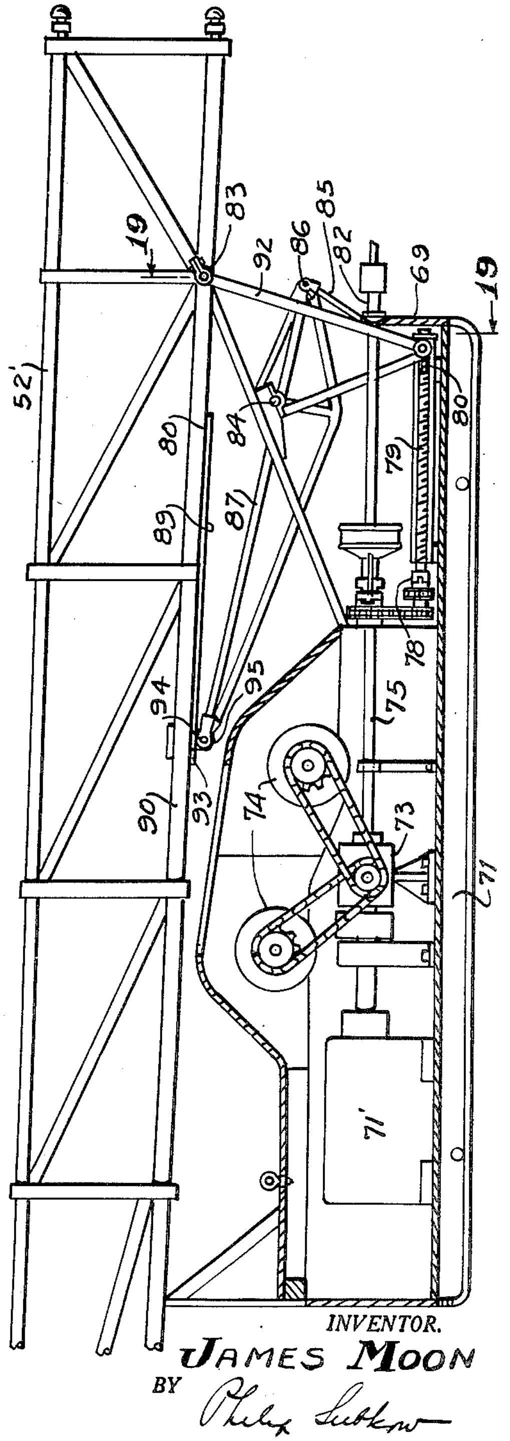
Fig. 18 is a section taken along line 18—18 of Fig. 17.

Instead of using a levelling foot such as 40, a wedge or cone-shaped foot may be used as illustrated in Fig. 16, in which case the ball-and-socket joint is not employed. The purpose of this variation will be described below.

In employing more than one of the cells in forming the drilling platform, as is desirable in a multiple unit drilling platform where a plurality of wells are to be drilled for the development of an oil field, I also provide an aligning joint and also means for connecting the sections into a rigid structure. These aligning joints are made up of detents 46 and mating bosses 45, the detents 46 and the bosses 45 being axially aligned. Thus, the bosses 45 positioned on one end wall and the bosses 45 on the opposite end wall are in axial alignment, one being shown on each end wall in Fig. 10. Similarly, there are detents positioned on one side wall in sufficient number to assure the proper alignment, four being shown in the drawing (Fig. 10), and an equal number of bosses positioned on the opposite side wall of the tank in axial alignment with the bosses on the opposite side wall. It will be observed that the bosses 45 are conical in shape as are the detents 46 for the purpose to be described later.

Positioned along the length of the upright columnar supports are a plurality of angle irons 47, one leg 48 of the angle iron 47 being welded to the upright and the free ends of the angle irons being provided with a bore 50. Two complementary angle irons are employed at each location so that the free extending ends 49 are at right angles to each other. The peripheral cells, that is, those which are on the outside of the pier structure, also carry angles 51, as will be described below.

A cell so constructed, omitting the conductor pipe and the rotary table, may be assembled first upon the shore and moved as a unit to the site either on a barge or by floating the structure on pontoons or by itself by providing an additional flotation tank attached to the upper portion of the structure in a manner described in my Patent No. 2,539,695.

However carried to the site, the cell is erected in position by attaching lines to the deck portion 2 of the structure. The cap 28 is removed from the pipe 7, attaching the fittings 29 and 30 to the pipe 7, and connecting the valve conduit 30 to a water line. Water is then introduced through line 30 down pipe 7, through the perforated pipe 43, and in this way water enters 23 to decrease the buoyancy of the tank and lower the center of mass of the structure so that the structure rotates in the water. The tank 23 descends, causing the whole structure to sink as the water rises in the tank at a rate determined by control of the valve 31. The structure sinks gently into the water under this controlled buoyancy condition. Divers in the bottom may drive the structure to the desired location.

Selection of the location determines the predetermined height of the cell. The location is originally surveyed to determine the depth of water and also the condition of wave action in the region. The height of the cells is desirably such that the distance between the submarine bottom and the bottom of the deck 2 will permit the waves to pass underneath the deck 2. The purpose is to avoid any uplifting force or to minimize the uplifting force which may be obtained from wave action. This determines the height of the cell.

Depending upon the nature of the bottom, suitably provided anchors are then attached to the corners of the structure which aid, in addition to the water in the tank 23, in holding the structure upright and on bottom.

A second cell may then be moved into position. The aligning joints are mated, the detent of one cell receiving the boss of the adjoining cell. The bores 50 of the angles 47 positioned in columns 6 and 8 are thus caused to register with like bores and like angle irons positioned on the columns 9 and 7 of the adjacent unit. These may then be bolted by the divers.

It will be noted that the levelling foot of the second unit is adjacent the jetting pipe 8 of the first cell. The pier structure may also be extended laterally by adding additional cells broadside of the first two cells in position. Thus, a third cell may be settled at the bottom in the manner previously described so that the beam 12 or 12' abuts 12 or 12' of the previous positioned cells. The bosses or detents of the third cell mate with the bosses or detents of the first or second cell, depending upon which side the unit 13 is positioned.

Figure 6:
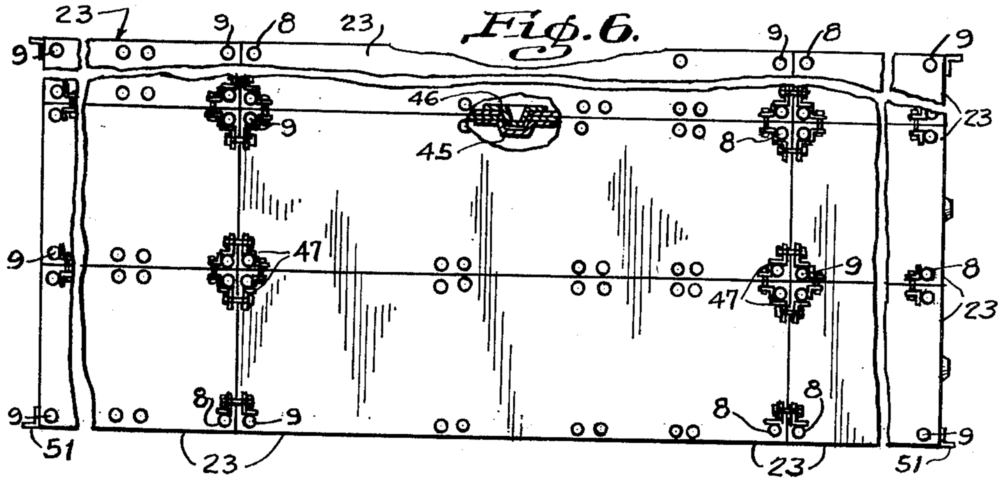
Fig. 6 is a fragmentary section taken along line 6—6 of Fig. 1.
Figure 14:
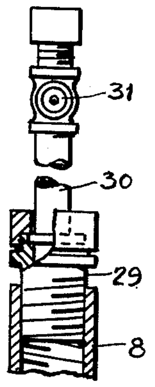
Fig. 14 is a detail section taken along line 14—14 of Fig. 8.
Figure 12:
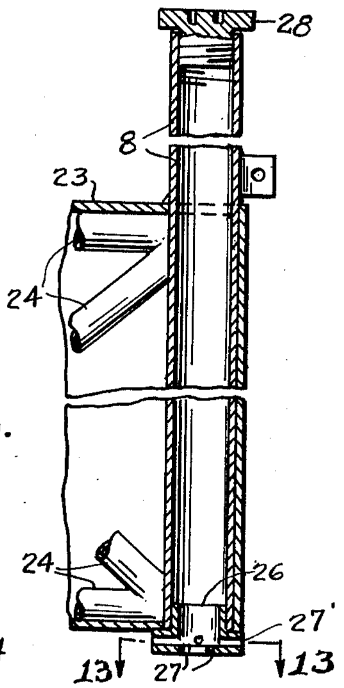
Fig. 12 is a detail section taken along line 12—12 of Fig. 8.
Figure 11:
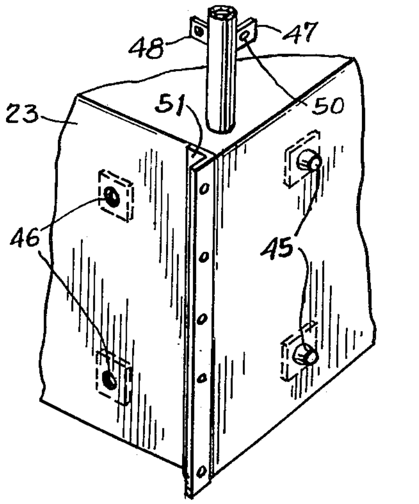
Fig. 11 is a detail of one corner of the tank of Fig. 7.
Figure 15:
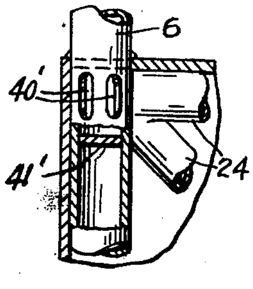
Fig. 15 is a section taken along line 15—15 of Fig. 18.
Figure 13:
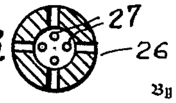
Fig. 13 is a section on line 13—13 of Fig. 12.

It will be observed here again that the jet of the third cell will be adjacent the levelling foot of the fourth cell and in line with that of the first or second cell, respectively (see Fig. 6). Again the positioning of the angle occurs when the alignment joints are in position and the holes of the angles are in registry and the units may be bolted together. This joins all four units. In this way any number of units or cells may be coupled together and positioned on the bottom. In this manner any number of units may be connected to give any desired length or width of drilling platform.

It will be observed that if the units are assembled so that the drilling site bay 3 of one unit is adjacent the drilling equipment supporting bay 5 in the longitudinal extension of the drilling platform and across the drilling platform, the drilling site bay 3 is adjacent the drilling site bay 3 of the next adjacent cell across the width of the platform, that a drilling levelling foot 9 will be adjacent a jetting foot 8, but there will be a levelling foot at one corner of the structure and no levelling foot at the other three corners of the structure. Due to the fact that the ends of each cell are complementary, in that there is a detent on one side and a boss on the other, all but one of the corner cells may be rotated 180° so that the four levelling feet are positioned at the corners of the drilling platform as illustrated in Fig. 6. In the addition at one end of the structure every alternate cell may be rotated 180° in this fashion and along one side of the structure it may be rotated 180° as illustrated in Fig. 6, and in this way levelling feet may be distributed along all four sides and at the corners of the structure.

When the structure is erected, or during the erection of the structure after a sufficient number of cells are in position, the jetting pipes 8 are connected to a source of jetting fluid by removing the caps 28 from each of the pipes 8 of the several cells and connecting a source of fluid pressure, such as air or water, to the pipes 8 by putting fittings such as 29 into the several pipes and connecting them with the source of fluid pressure. The several pipes 9 are likewise connected to a fluid pressure such as air or water by simply removing plugs 28 from such pipes and connecting a fitting such as 29 in place thereof. The fluid is jetted through the nozzles 27 to scour the bottom underneath the tank and pressure is exerted on the piston head 33 of each of the levelling feet connected to each of the pipes 9. By regulating the pressure in the several pipes 9 the structure may be levelled. When the structure is levelled the valve 31 on the line connected to the levelling feet is closed thus holding pressure in the line and maintaining the position of the levelling feet.

The tanks 23 of the several units may then be filled with water by pumping water down the various pipes 7 until the water is at the top of the tank and water rises through the orifices 40' to the top of the various pipes 6, showing that the tanks have been filled with water. If desired the tanks may be filled with cement or other weighting material by introducing cement instead of water, the cement being introduced through the various pipes 7 and the water, due to the higher gravity of the cement, being displaced by the cement and discharged through the orifices 40', the cement rising up the pipes 6 and filling the pipes with cement. This increases the weight of the tanks and lowers the center of mass of the structure.

If desired the stability of the structure may be increased by employing, instead of the levelling feet 40, piles connected to the piston rod 36, as illustrated in Fig. 16.

The piston rod and the barrel of one or more of the pipes 9 distributed throughout the structure may be extended to be greater in length than that employed when using a levelling foot or may be of the same length as the levelling foot if the piston rod is of sufficient extension for the purpose. With the aid of the scouring action of jet nozzles 27, the pile is forced into the ground to form an anchor for the structure. These anchors may be distributed strategically across the length and width of the structure and at various locations throughout to give the desired anchoring points in place of or in addition to the levelling feet, as will be understood by those skilled in the art.

In order to improve the penetration I may employ a weight 52, as illustrated in Fig. 16. Thus, I may position a weight 52 in the pipe 9, the head 53 being connected to pile 54 and positioned within the pipe 9. The freely moving weight 52 acts as a travelling piston. Orifices 55 connect the pipe 9 underneath the head 53 with the pipe above the head 53 and underneath the weight 52. The pile 54 passes through a plug 56 at the bottom of the pipe 9 and terminates in a wedge or point 57. The plug has a bore 56' which makes a relatively fluidtight friction fit with the pile 54. I may connect the pipe 9 above the plug 56 to the discharge of an air compressor 58 and an air reserve tank 59. The tank 59 is connected to pipe 30 and valve 31 in the fitting 29 positioned at the top of pipe 9. By providing valves 60 and 61 in the discharge and intake lines and by-pass 62 and valve 65 and by-pass 63 and valve 64, the intake of the compressor may be selectively connected either to pipe 30 or 59*a* above the plug 56, and the discharge of the tank passed into either 59 or 30, respectively.

Assuming the hammer to be on top of the head 53, upon closing valves 60, 61 and opening 64, 31 and 65, air may be passed under pressure from 59 and underneath 52, air discharging from above 52 through 30, valve 65 and into 59 via compressor 58. This causes the hammer to move to the top of the pipe. By reversing the circulation of air, air may be pumped on top of the travelling piston weight and withdrawn underneath the piston weight, causing it to move at high velocity under the combined influence of gravity and air pressure down the pipe until it strikes a blow on the top of the piston. In this way the repeated up and down movement of the hammer 52 causes the penetration of the wedge 57 and the pile 54 transforms the pipe 9 into a pile driven into the ground with the pile 54 supported in 9 at 52 and 56. The penetration of the wedge is aided by simultaneous operation of the jets at the adjacent pipes 8 of the adjacent cells. Instead of using this method of driving anchoring piles, I may use a conventional pile 54' (see Fig. 20) which I position inside the column 9 and drive into the bottom through the end of 9 by conventional pile driver mounted on the platform or on an adjacent barge.

When a sufficient number of these cell units have been erected to give the areal extension of the platform desired, a mast may be erected on the platform so that it may reach over the side of the platform for the purpose described below and reach all portions thereof.

Thus a standard rotary crane such as a rotary pillar crane may be erected at some suitable location on the drilling platform. Such a crane has the usual foundation and turntable 66. Swinging boom 67 is provided with suitable lines and winches 68. The boom, therefore, can be swung over the side or to all locations of the drilling platform. If the platform is of such an extent that this crane is not suitable to reach all portions thereof, a plurality of such cranes may be employed or a moving crane installed.

While this foundation may be employed with standard permanently erected derricks such as are used in the oil fields or as have been employed in drilling in ocean bottoms, such derricks require a large footing. Thus, for standard derricks of 94' in height, for example, the footings of the derrick are 24' apart; whereas the drilling equipment including the drawworks and the rotary table and the engine occupy a width of only about 8'.

Thus the drilling base at all points, other than the derrick site, must be 16' wider than necessary to support the drilling equipment. By employing such telescopic derricks which are retractible and collapsible and which when erected take an inclined position to the vertical with the crown block over the well site, I may employ 94' derricks with footings of about 7' wide by 3' deep. Thus, I may make my individual cells of about 19' in width and 40' in length instead of about 30' by 65' as would be required if I employed permanently installed derricks of standard design. I am able to save a substantial amount of space and maximize the number of cell locations I may obtain per square foot of foundation platform surface. Such masts are described in my patent No. 2,583,958, issued January 29, 1952, and Serial No. 677,584, filed June 18, 1946, now abandoned, and have been employed in connection with portable drilling and servicing equipment in which the equipment is mounted on truck and trailer. Whereas normally the problem of space is not important on land, it becomes of material consideration in connection with the construction such as is included in this application. It will be observed that the ability to narrow each cell and reduce its overall length makes possible positioning of a greater number of such cells per square foot of platform. This is of prime importance in submarine drilling where the cost of the platform is a major item of the cost of drilling.

Another advantage of employing such portable equipment in connection with the drilling on submarine drilling platforms, as described herein, is that one such unit may be employed for the drilling of all of the wells, moving it from place to place. Additionally, when storms or other undesirable weather conditions make it impossible to continue drilling, the derrick may be collapsed and laid down on the platform, or if necessary may be picked up and put aboard ship and moved to safe harbor.

It will be observed also that the crane as employed here may also be laid down on the platform floor and thus be secure in case of heavy weather.

Drilling equipment is mounted upon a platform which is in turn mounted upon two parallel skid beams 71 and with a housing 69 provided to enclose the drilling equipment against the weather. The drilling equipment contains a source of motive power, such as an internal combustion engine shown at 71', power transferring shafting and gear box 73, hoists 74, chain driven through the gear box, a propeller shaft 75 with clutches 76 and 78, power transmission chain drive 39 for rotating the derrick elevating screw 79, and the main power shaft 82 which is connected to the rotary table.

The sectional derrick 90 is hingedly mounted on hinge pine 83 upon two frames 92 which are mounted on the platform 34 in any suitable manner. Mounted upon the screws 79 are travelling nuts 80 each of which carries a hinge upon which the levers 85 are rotatably mounted. The levers 85 are connected to hinge 87 upon the frame 86 which frame is pivoted at 84 upon the frames 92. The other ends of the frames 86 are connected to slides 95 and a hinge 94, the slides 95 being each slidably mounted on slide 93, one mounted upon each of the legs 89 of the lower section of the derrick 90.

It will be observed that the hinge point 83 is outside the platform 69 for the reasons more fully described below.

The derrick is a sectional derrick composed of a lower member 52', an upper member 96 which is slidably and telescopically positioned inside the lower section 52' in such manner that it may be elevated and extended as shown in Fig. 1 and secured in extended position. Such derricks are well known and need not be further described. Reference may be had to my abandoned application Serial No. 677,584, filed June 18, 1946; Patent No. 2,583,958; Serial No. 786,461 filed November 17, 1947, now abandoned; Serial No. 10,412, filed February 24, 1948, now abandoned; and Serial No. 74,871, filed February 7, 1949, for further description of the details of construction of such derrick and also for alternative methods of rotating and extending the derrick and retracting and collapsing the derrick.

Such drilling equipment may be moved to a location upon a ship 93 which may draw alongside the drilling platform and the boom 67 may pick up the equipment by lines 96' and move it into position.

Figures 4, 5:
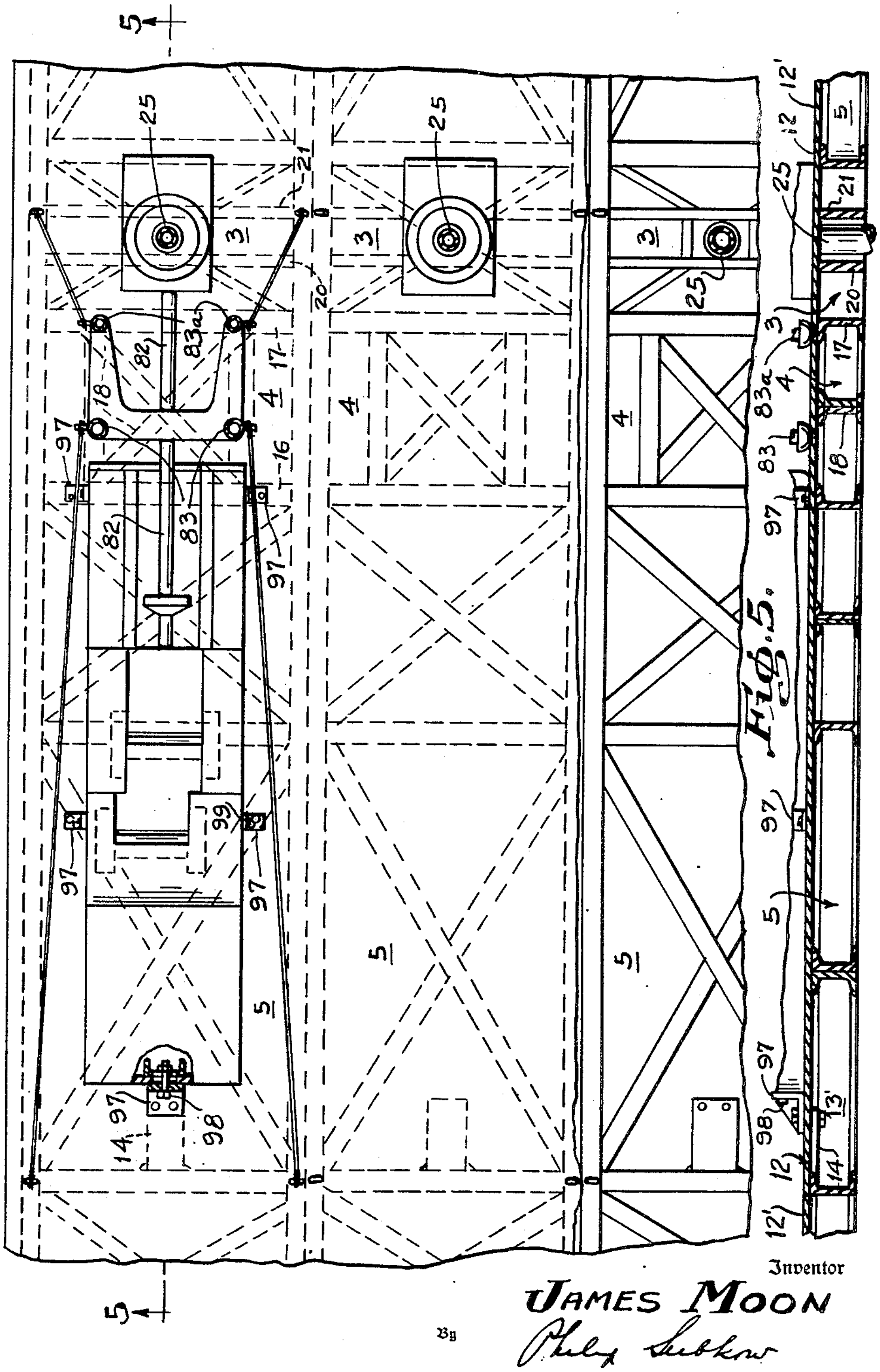
Fig. 4 is a fragmentary section of the plan view of Fig. 3.
Fig. 5 is a section taken on line 5—5 of Fig. 4.

By reference to Figs. 4 and 5 it will be observed that the cell is framed so that the cross members and tie members are positioned underneath the hoist and underneath the engine. In order to properly locate the equipment for the purposes to be more fully described hereafter, bracket 97 is positioned on the beam 13' and on the cross beams 14 and on the beam 16. These brackets cooperate with suitable holes positioned in the skids in order that the skids may be dropped between the brackets and clamped thereto by clamping bolts as shown by 98 and 99 on Fig. 4.

When so positioned the derrick may then be erected and extended in the manner described in the previously referred to patent applications. The rotation of the screws 79 will retract the travelling nuts 80, causing the derrick to be pivoted around pivot point 84, the slide block 93 travelling down the slide 89 causing the derrick to be erected. Subsequently the extensible portion or upper member 96 may be extended. When the derrick is erected the four legs of the derrick are positioned as shown in Fig. 4, the two back legs of the derrick being positioned on the members 18 and the two forward legs being positioned on the member 17. This determines the spacing of these members for this purpose.

The derrick when it is erected is so spaced with respect to the well location that the center line of the opening defined by members 20 and 21 is such that the crown block of the derrick is in line with the center line of the casing to be positioned in such space. The derrick has about a 6° forward tilt. The crown block 97 must be accurately positioned so that it will be over the axis of the casing. This is essential in order that the derrick be in operative relation with the well bore so that eccentric loading be not imposed upon the derrick. If the derrick is not so accurately positioned, the large load imposed by the drill string and casing by means of the hoist line 98 and travelling block 99 will impose excessive load on the derrick and failure may result.

Additionally, unless the derrick is so positioned that the line of pull from the crown block through the travelling block is axial with the casing of the well bore, difficulties in running casing and tubing will occur. It will be observed that the derrick legs are extended beyond a hinge point on which the derrick is mounted in such manner that when the platform is in position and the derrick is erected the ends of the legs 83 and 83a are positioned on the load carrying members designed to receive them. When thus properly positioned the propeller shaft 82 may be connected to the turntable 100 of the rotary.

The above design permits of the accurate spotting of the derrick with respect to the well site and also provides for the placing of load carrying members underneath the derrick legs. In this manner I may erect a drill site platform for the development of a submarine oil field using portable drilling equipment and using the maximum crowding of well sites upon the drilling platform. It will be observed that this crowding is far too close for any efficient development of an oil field if vertical bore holes are drilled. It is generally understood and well recognized in oil field development that wells should be bottomed in an oil producing horizon at a minimum spacing determined by good engineering practice. This I may accomplish notwithstanding the crowded condition of the drill site upon the well sites upon the platform by directional drilling so that the bore holes are bottomed in the producing horizon with the desired spacing. Such drilling methods are well known and have been employed in submarine drilling and may be employed here.

After the oil field has been developed and all drilling has been accomplished, the platform may be used for oil producing wells and for carrying tank or other equipment. When the oil wells have reached a position where they need to be pumped, pumping equipment may then be placed upon the drilling platform. These are illustrated by the conventional pumping apparatus shown at 100. The pumping equipment is positioned over the drilling bay of the next adjacent drilling equipment in rows back to back. Space is provided for the positioning of the portable servicing equipment which is similar in construction to the drilling equipment as described above and which may be moved in position for the servicing of the oil well pump as is conventional in oil field operation.

While I have described a particular embodiment of my invention for the purpose of illustration, it should be understood that various modifications and adaptations thereof may be made within the spirit of the invention as set forth in the appended claims.

I claim:

1. A transportable drilling platform cell adapted to be erected on a marine bottom to support a well casing, drilling derrick and a rotary table of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, and cross members at the well site bay connecting said lateral members spaced to receive a well caisson and a rotary table.

2. A cellular marine structure erected on a marine bottom, comprising a plurality of cells constructed according to claim 1, said cells being arranged one adjacent another, alignment joints between said cells, and means for connecting said aligned cells together into a unitary structure.

3. A transportable drilling platform cell adapted to be erected on a marine bottom to support a well, casing, drilling derrick, a rotary table, drilling engine, and hoist of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, and a tank mounted on said vertical members and extending between the extreme corner vertical members of said cell.

4. A cellular marine structure erected on a marine bottom, comprising a plurality of cells constructed according to claim 3, said cells being arranged one adjacent another, alignment joints between said cells, and means for connecting said aligned cells together into a unitary structure.

5. A transportable drilling platform cell adapted to be erected on a marine bottom to support a well casing, drilling derrick and a rotary table of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, one of said vertical members being tubular and connected to said tank for introduction of fluid into said tank, and another of said vertical members being tubular and connected to said tank for the discharge of fluid from said tank.

6. A cellular marine structure to be erected on a marine bottom, comprising a plurality of cells constructed according to claim 5, said cells being arranged one adjacent another, alignment joints between said cells, and means for connecting said aligned cells together into a unitary structure.

7. A transportable drilling platform cell adapted to be erected on a marine bottom to support a well, casing, drilling derrick, a rotary table, drilling engine, and hoist of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, side vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, a levelling foot connected near the bottom of said tank, and means operable from the other end of said cell for actuating said levelling foot.

8. A cellular marine structure erected on a marine bottom, comprising a plurality of cells constructed according to claim 7, said cells being arranged one adjacent another, alignment joints between said cells, and means for connecting said aligned cells together into a unitary structure.

9. A transportable drilling platform cell adapted to be erected on a marine bottom to support a well casing, drilling derrick and a rotary table of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, a jet line extending the longitudinal length of said cell and terminating near the bottom of said tank, a leveling foot connected near the bottom of said tank, and means operable from the other end of said cell for actuating said leveling foot.

10. A cellular marine structure erected on a marine bottom, comprising a plurality of cells constructed according to claim 9, said cells being arranged one adjacent another, alignment joints between said cells, and means for connecting said aligned cells together into a unitary structure.

11. A transportable drilling platform cell adapted to be erected on a marine bottom to support a well, casing, drilling derrick, a rotary table, drilling engine, and hoist of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, said vertical corner members being tubular and acting as a fluid inlet conduit into said tank, another of said vertical members being tubular and connecting with said tank to act as a discharge for fluid from said tank, a third of said vertical members being tubular and open at one end adjacent the bottom of said tank, and a jet fitting attached to said open end.

12. A cellular marine structure erected on a marine bottom, comprising a plurality of cells constructed according to claim 11, said cells being arranged one adjacent another, alignment joints between said cells, and means for connecting said aligned cells together into a unitary structure.

13. A cell, transportable as a unit, for assembly with other such cells into a drilling platform to be erected on a marine bottom to support a well, casing, drilling derrick, a rotary table, drilling engine, and hoist of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, said vertical corner members being tubular and acting as a fluid inlet conduit into said tank, another of said vertical members being tubular and connecting with said tank to act as a discharge for fluid from said tank, a third of said vertical members being tubular and open at one end adjacent the bottom of said tank, a jet fitting attached to said open end, a fourth of said corner vertical members containing a piston mounted therein, a piston rod connected to said piston, a leveling foot connected to said piston rod positioned near the bottom of said tank, and means adjacent the top of said tank for closing all of said vertical tubular members.

14. A cellular marine structure erected on a marine bottom, comprising a plurality of cells constructed according to claim 13, said cells being arranged one adjacent another, alignment joints between said cells, and means for connecting said aligned cells together into a unitary structure.

15. A transportable drilling platform cell adapted to be erected on a marine bottom to support a well, casing, drilling derrick, a rotary table, drilling engine, and hoist of an oil well drilling structure, said cell comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, and cross members at the well site bay connecting said lateral members spaced to receive a well caisson and a rotary table, and certain of said vertical members being tubular from the surface to the end of said vertical pipe and adapted to receive a pile to be driven through said tubular members.

16. A drilling platform including a cell to support a well casing, drilling derrick, a rotary table, drilling engine, and hoist of an oil well drilling structure, a well site bay for the positioning of a rotary table and well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, and a tank mounted on said vertical members and extending between the extreme corner vertical members of said cell, certain of said vertical members being tubular, and piles driven through said tubular members into the submarine bottom.

17. A drilling platform including a cell to support a well casing, drilling derrick, a rotary table, drilling engine, and hoist of an oil well drilling structure comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, one of said vertical members being tubular and connected to said tank for introduction of fluid into said tank, and another of said vertical members being tubular and connected to said tank for the discharge of fluid from said tank, and others of said vertical members being also tubular, and piles driven through said tubular members into the submarine bottom.

18. A drilling platform including a cell to support a well casing, drilling derrick, a rotary table, drilling engine, and hoist of an oil well drilling structure comprising a well site bay for the positioning of the rotary table and the well casing, a derrick supporting bay for supporting the drilling derrick, a drilling apparatus bay for supporting drilling engine and hoist, vertical members including corner members at said well site bay, corner members at said drilling apparatus bay, a plurality of vertical members positioned on each side of the cell between said corner members to form the corners of said bays, lateral members extending longitudinally of said cell and lateral members extending along the width of said cell forming the outline of said cell, said vertical members positioned at the corners of said derrick supporting bay being spaced to receive the legs of a derrick, cross members at the well site bay connecting said lateral members spaced to receive the well caisson and a rotary table, a tank mounted on said vertical members and extending between the extreme corner vertical members of said cell, said vertical corner members being tubular and acting as a fluid inlet conduit into said tank, another of said vertical members being tubular and connecting with said tank to act as a discharge for fluid from said tank, a third of said vertical members being tubular and open at one end adjacent the bottom of said tank, a jet fitting attached to said open end, and the fourth of said vertical members being tubular, and a pile driven through said tubular member into the submarine bottom.

References Cited in the file of this patent

UNITED STATES PATENTS

| Number | Name | Date |
| --- | --- | --- |
| 1,867,030 | Roberts | July 12, 1932 |
| 2,178,667 | Littlefield | Nov. 7, 1939 |
| 2,210,408 | Henry | Aug. 6, 1940 |
| 2,327,118 | MacKnight | Aug. 17, 1943 |
| 2,352,370 | Carruthers | June 27, 1944 |
| 2,398,351 | Baker | Apr. 16, 1946 |
| 2,422,168 | Kirby | June 10, 1947 |
| 2,429,952 | Willey | Oct. 28, 1947 |
| 2,482,788 | Moon | Sept. 27, 1949 |
| 2,574,140 | Boschen | Nov. 6, 1951 |
| 2,598,329 | Wilson | May 27, 1952 |